June 18, 1935.  G. S. BOWES  2,005,128
VALVE
Filed Sept. 4, 1931  4 Sheets-Sheet 1
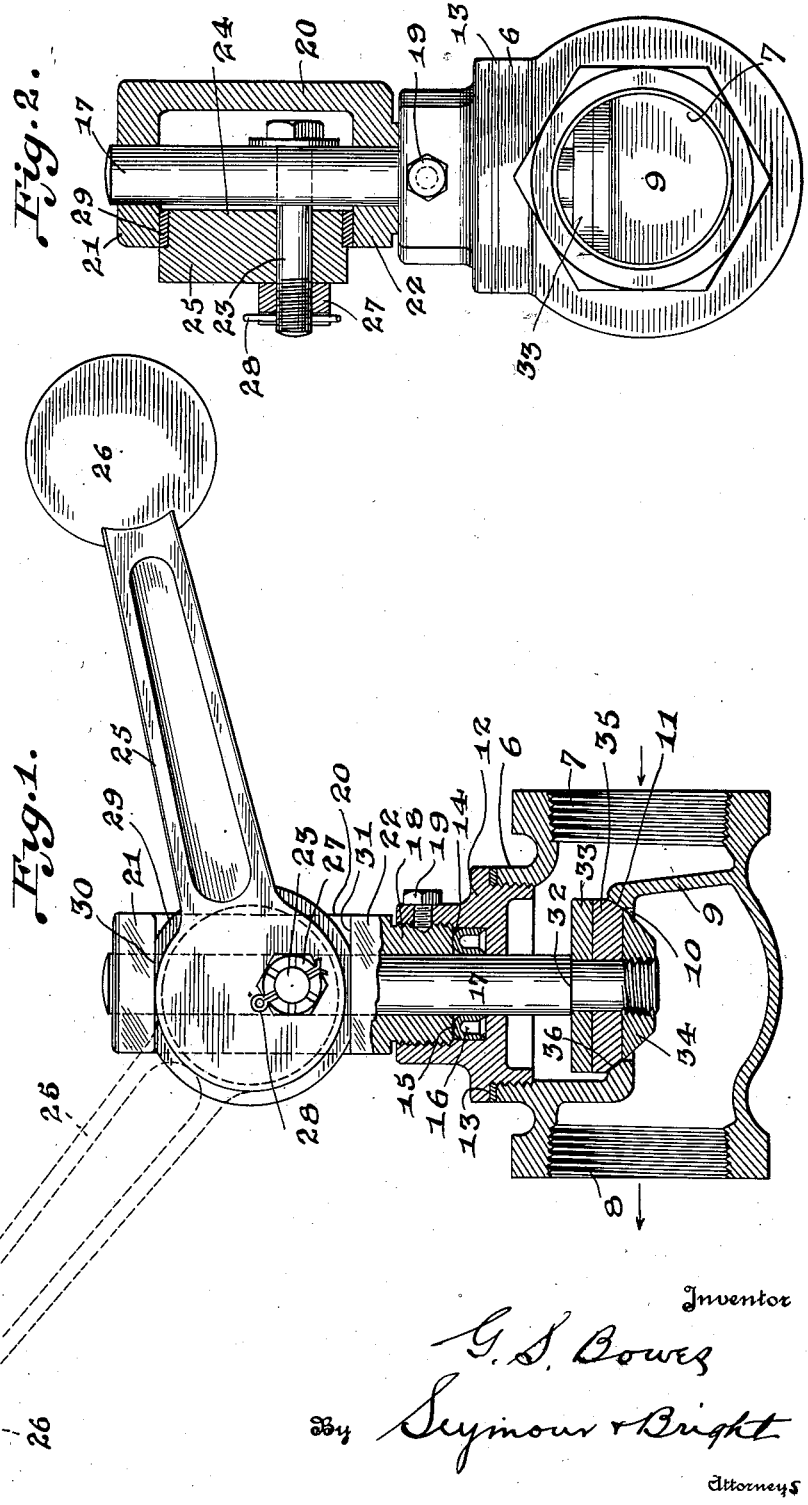
Inventor
G. S. Bowes
By Seymour & Bright
Attorneys June 18, 1935.  G. S. BOWES  2,005,128
VALVE
Filed Sept. 4, 1931  4 Sheets-Sheet 2
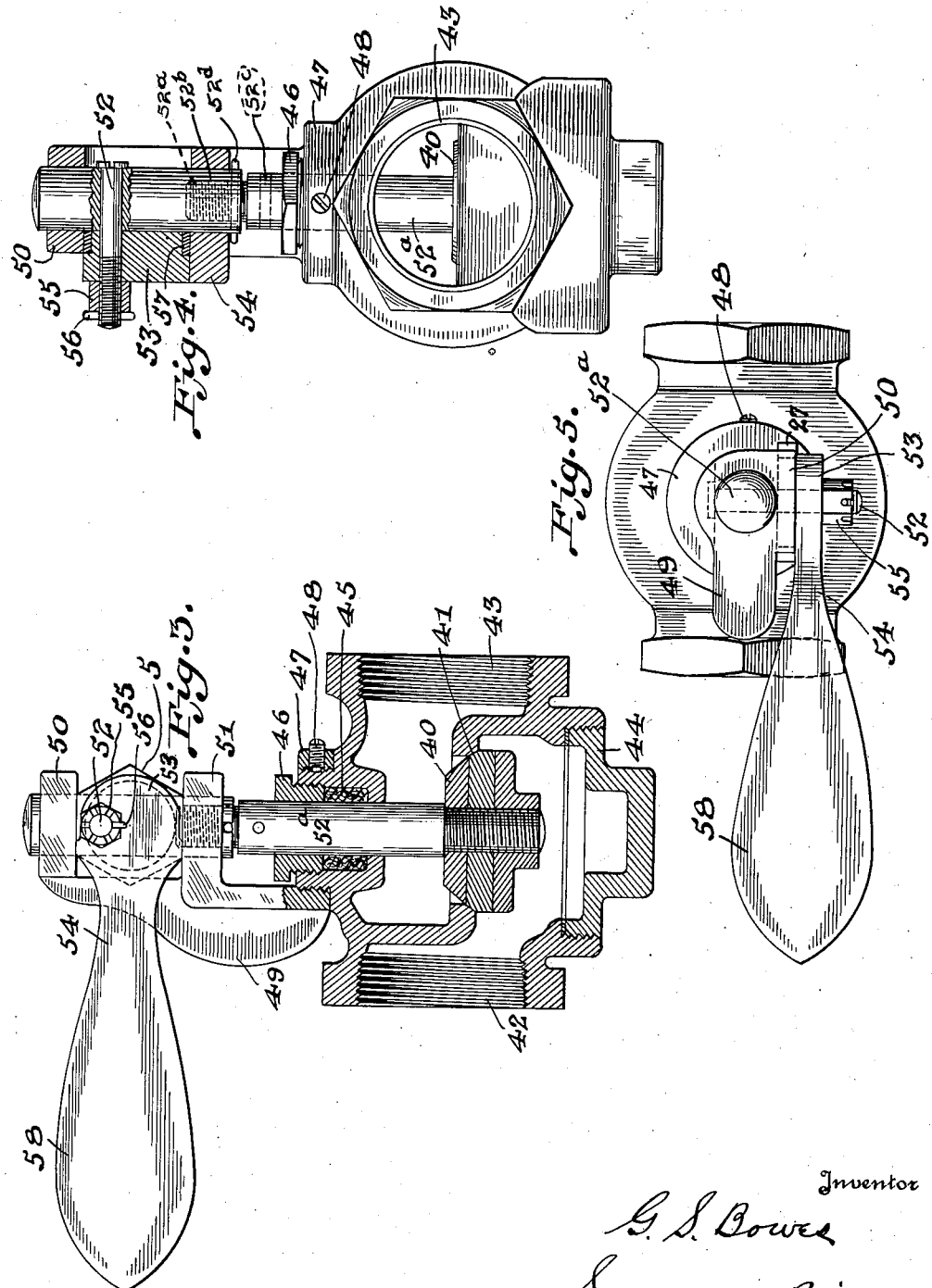

June 18, 1935.   G. S. BOWES   2,005,128
VALVE
Filed Sept. 4, 1931   4 Sheets-Sheet 3
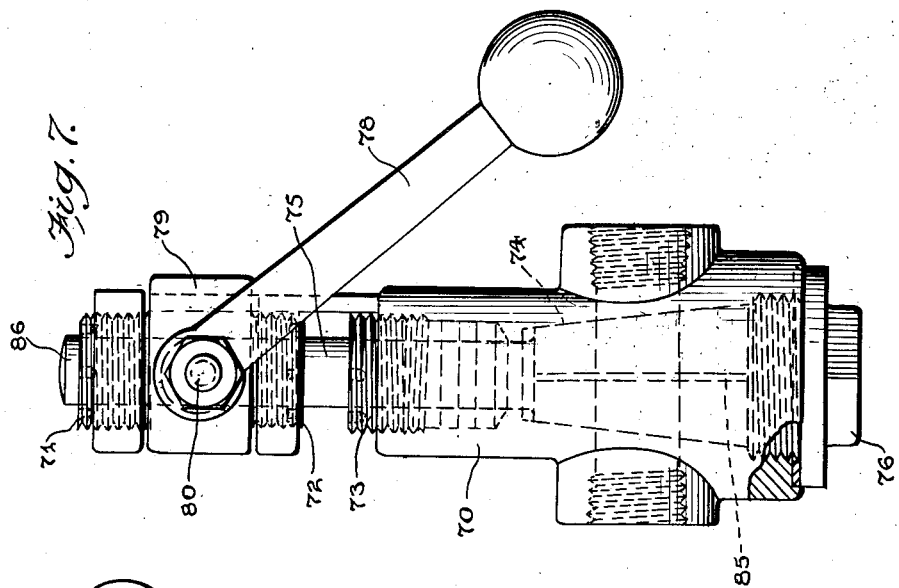
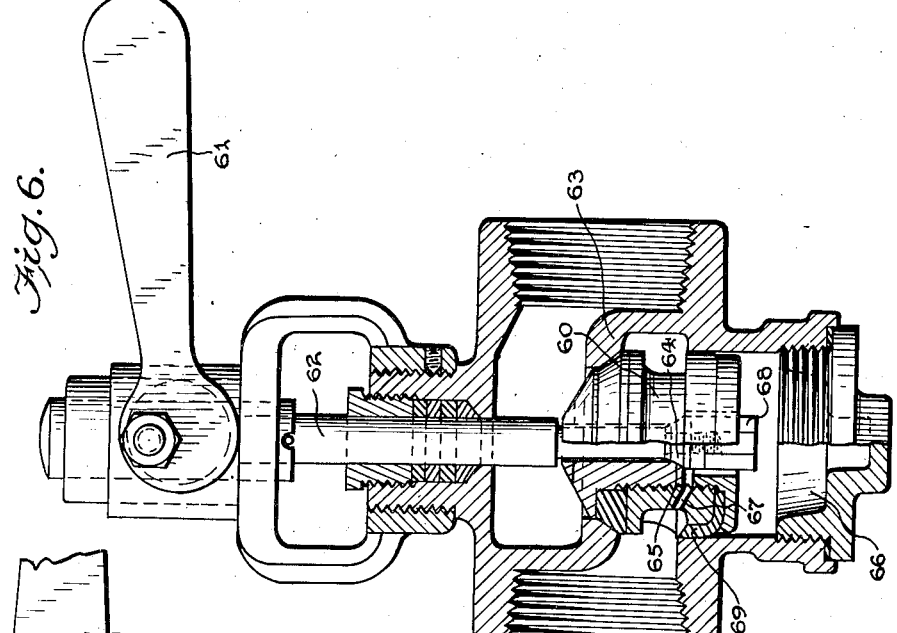
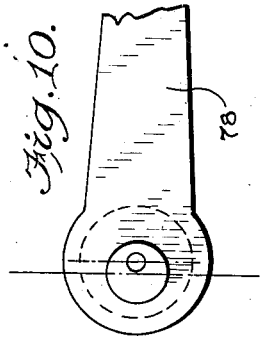

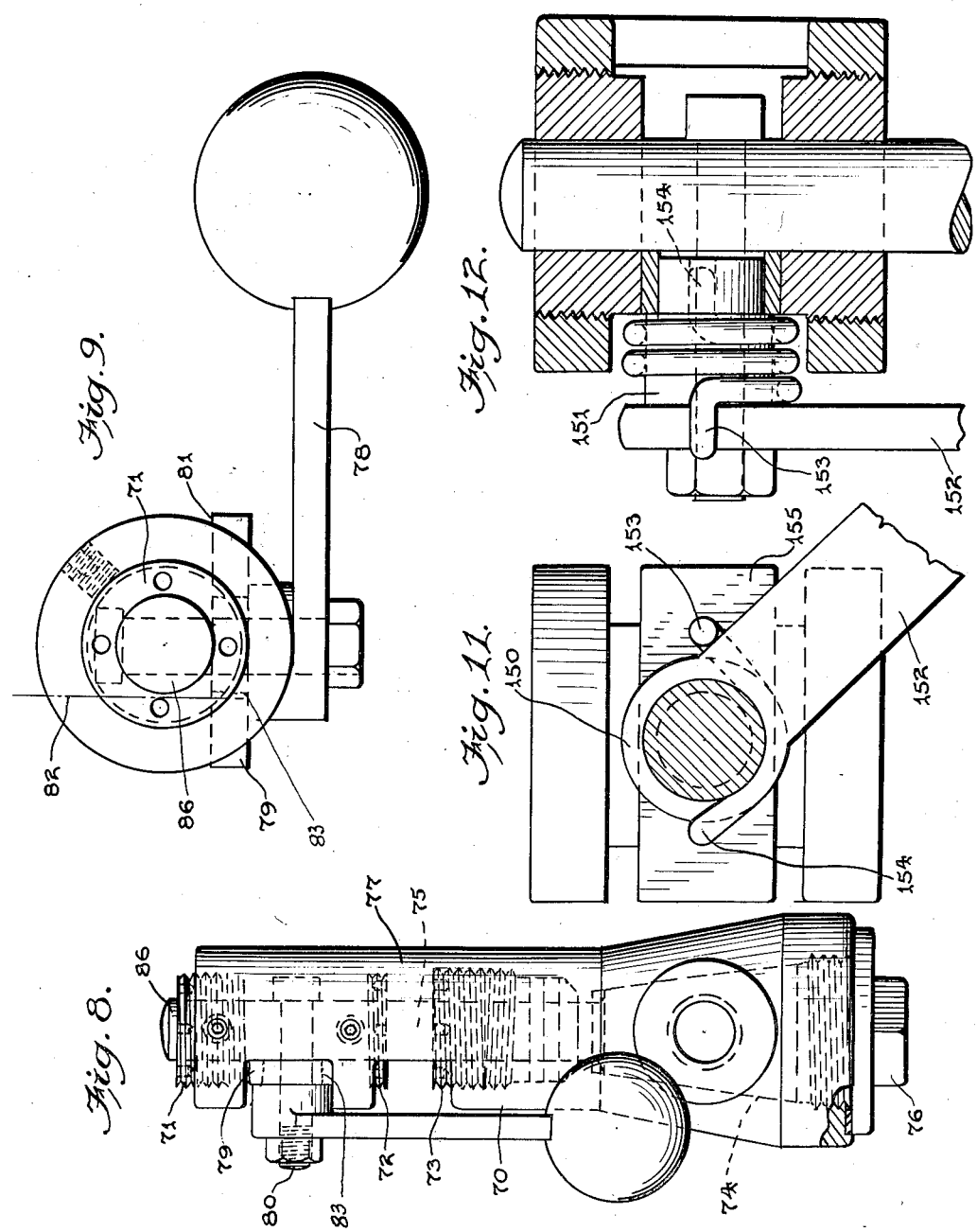

Patented June 18, 1935

2,005,128

UNITED STATES PATENT OFFICE 2,005,128

VALVE

George S. Bowes, Cleveland, Ohio

Application September 4, 1931, Serial No. 561,231

6 Claims. (Cl. 251—40)

This invention relates to improvements in valves, and more especially to valves for use in cutting off the flow of high pressure fluids.

Usually, the active member or head of such valves is actuated by means of a hand wheel or lever, and if the operator is negligent and fails to close the valve tight, there will be a seepage or flow of the fluid between the valve head and its seat, and due to the high velocity of the flow, both the seat and the head will soon be damaged beyond repair.

The primary object of the present invention is to provide a valve which will not depend for its closing entirely upon the operator, but which will automatically close, once the operator has moved the same toward closing position.

A further object is to provide a construction of this character, in which the valve head is not only forced toward its seat by a weighted mass, but is also pressed against its seat by the pressure fluid in the line in which the valve is interposed. This combination of forces relieves the operator of the necessity of fully closing the valve, and insures the tight closing of the latter, so that there will be no wire drawing of the valve head or its seat.

A still further object is to provide a hand operated valve including a cam mechanism which will render easy the opening and closing movements of the valve by the operator.

Another object is to furnish for valves in general, a valve head comprising a fibrous disk which is confined by metal members, and is adapted to engage with its edge only the seat of the valve casing.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a side elevation partly in vertical section.

Fig. 2 is an end elevation of the same, partly in transverse vertical section.

Figs. 3 and 4 are views, similar to Figs. 1 and 2, of a modification.

Fig. 5 is a top plan view of the valve shown in Figs. 3 and 4.

Fig. 6 is a vertical sectional view partly in elevation of a balanced high pressure and throttling valve.

Fig. 7 is a side elevation of a plug type valve made in accordance with my invention.

Fig. 8 is a similar view of the same taken at right angles to the view shown in Fig. 7.

Fig. 9 is a top plan view of the plug type valve.

Fig. 10 is an elevation of a portion of the handle.

Figs. 11 and 12 are detail views of the upper portion of the valve showing a spring which may be used in place of the weight on the handle.

Referring to Figs. 1 and 2, 6 designates a valve casing having a threaded inlet 7 and a threaded outlet 8. These parts are separated by a partition 9 forming a port 10 which constitutes a frusto-conical valve seat 11. Such parts are made of any suitable metal capable of withstanding the high pressure of the fluid conveyed through the pipe line (not shown), in which the valve is interposed.

A bonnet 12 is screwed into the top of the casing, and a suitable gasket is interposed at 13 between these parts. The bonnet forms an annular chamber 14 in which I preferably interpose a packing ring 15 of inverted U-shape, that is, with its channel 16 facing the interior of the valve casing, so that any fluid seeping upwardly along the stem 17 will enter the channel and act to expand the packing to prevent leakage.

A threaded boss 18 is screwed into the bonnet, and a small screw 19 may be employed to lock the boss in position.

A post 20 is integral with the boss 18, and the post has at its upper and lower ends, shelves 21 and 22.

The valve stem 17 is mounted for reciprocation in the parts 12, 18, 22 and 21; and between the shelves, a bolt 23 passes rotatably through the stem.

A cylindrical cam 24 is rotatably mounted on the bolt, and is integral with a handle 25 that is provided with a weighted mass, as shown at 26. The handle is held on the bolt by a nut 27, and a cotter pin 28.

It will be noted that the bolt passes eccentrically through the cam 24, and the periphery of the latter rotates in a ring 29 which forms a wearing member and has flat upper and lower surfaces which engage the shelves 21 and 22 along the horizontal planes 30 and 31.

Within the casing, the stem has a shoulder 32 against which a metal washer 33 abuts, and between this washer and a frusto-conical nut 34 which is threaded on the stem, a fibre washer 35 is interposed. The fibre washer is of the type formed of highly compressed paper or the like, and it has a frusto-conical peripheral portion 36 which engages the seat 11. At this point it will be noted that the washer 35 is prevented from moving upwardly by the metal washer 33, downwardly by the nut 34, inwardly by the stem 17, and outwardly by the seat 11. Consequently, this washer will be protected from expanding to the point of deterioration, and yet, owing to its resiliency, will yield under the influence of any metal particles or the like, lodged between the washer and the valve seat, so as to prevent such particles from abrading the metal valve seat, or forming passageways between the washer and seat through which the fluid may leak.

It will be observed further that the valve head seats downwardly, whereby, when it is closed, pressure fluid in the inlet side of the valve casing, will act to urge the head toward the valve seat.

When the valve is closed, the parts will be in the position shown in full lines in Fig. 1, and the bolt 23 will be nearer the shelf 22 than the shelf 21. However, as soon as the handle 25 is moved in a counter-clock-wise direction, past the axis of the stem, the pin 23 will be caused to travel upwardly as the cam rotates in the ring 29, and this will result in lifting the valve stem 17, and with it, the valve head. Now, if the handle is released, the weight 26 will automatically move it to the dotted line position shown in Fig. 1, and the valve will be fully opened and held in this position by the weight.

When the valve is to be closed, the operator simply forces the handle in a counter-clock-wise direction, past the axis of the stem, and then the weight 26 automatically moves the valve head toward its seat, and this movement is aided by the fluid entering the inlet side of the casing. In other words, all the operator has to do is to move the handle toward closing position, and even if he releases it before the valve is actually closed, the force of the weight and the pressure of the fluid will take care of the tight closing of the valve.

It may be seen that the valve closes before the handle 25 moves downwardly into a horizontal position, and consequently, the weight 26 is always acting to hold the valve closed, even if there should be some wearing of the parts.

To make the thrust of the cam 24 effective, the threaded boss 18 can be screwed into or out of the part 12 and then be locked in adjusted position by means of the screw 19.

In the embodiment of the invention illustrated in Figs. 3 to 5 inclusive, a valve head 40 of the type shown in Figs. 1 and 2 closes upwardly against its seat 41 instead of downwardly, and this makes it necessary to put the inlet of the casing at 42, and the outlet at 43, to comply with my invention. Also, for the purpose of removing the valve head, the open bottom of the casing is closed by a suitable inverted threaded cap 44.

Instead of employing the channel-shaped type of packing 15, in the modification, I place ordinary packing in an annular chamber 45 in the head of the casing, and then control this by a packing gland 46. In this instance, the bonnet of the casing is integral with the latter and has external threads which cooperate with a threaded ring 47 that is locked in position by a screw 48.

A post 49 is integral with the ring and supports upper and lower shelves 50 and 51 and the stem 52ª which is made of two parts, passes upwardly through the bonnet of the casing, gland 46 and shelves 51 and 50. Here also a bolt 52 rotates in the stem and supports the cylindrical cam 53 of a handle 54, the latter being secured to the bolt by means of a nut 55 and pin 56. The ring 57 in which the cam rotates, in this form of the invention, has a hexagonal periphery, any two opposite surfaces of which may slide along the shelves 50 and 51. This feature permits new surfaces of the ring 57 to be brought into position after other surfaces of the same have become worn.

The handle 54 has a weight 58.

In operating this type of valve, it will be observed that in Fig. 3, the parts are shown in closed position, and that the bolt 52 is nearer the shelf 50 than the shelf 51. Consequently, if the handle is turned in a clock-wise direction, until it passes the axis of the stem 52ª, the bolt 52 will be moved toward the shelf 51 and the stem 52ª will be lowered, and with it the valve head 40. Now, if the handle is released, its weight 58 will move the valve head to fully opened position.

On the other hand, in closing the valve, after the handle has been moved in a counter-clock-wise direction past the axis of the stem, if the handle is released, its weight, augmented by the pressure of the fluid in the inlet side of the valve casing, will force the valve head toward its seat.

To make the thrust of the cam 53 effective, the distances between bolt 52 and the seat 41 must be more or less exact. Therefore, the stem is made of upper and lower sections which are threaded together at 52ᵇ. A small hole 52ᶜ in the lower section of the stem can receive a lever which may be inserted for the purpose of turning the lower section of the stem. After the adjustment has been made, a cotter pin 52ᵈ is inserted through one of a number of radial holes in the male member of the threaded connection, and through notches in the female member of such connection.

In Fig. 6 I have shown my invention embodied in a high pressure and throttling valve.

This valve is an adaptation of the Globe valve, of my design, for higher pressures. The operating mechanism at the bonnet is the same, the difference being at the plunger with the tapered seat.

The plunger 60 has been piloted, as shown, to make the valve operate easily under high pressures. The movement of the handle 61 gives a slight longitudinal motion to the stem 62 before the entire plunger assembly is moved to open the main valve seat 63. When this first small motion occurs, the small bevelled fibre washer 64 at the lower end of the stem is forced off its seat 65 allowing water beneath the plunger in chamber 66 to pass upward along the stem through the plunger which is broached to allow passage of this water, thereby relieving pressure in chamber 66 and allowing the plunger to be moved downward easily as the stem continues its downward motion as actuated by the movement of the handle. A small hole 67 is drilled through the plunger into the chamber 66 to prevent vacuum and to allow pressure to accumulate under the plunger, when the valve is closed, in order that this pressure can aid in holding the valve head tight. The fibre disc 64 on the end of the stem is bevelled to suit the seat 65 turned on inside of the plunger; the fibre disc being held in place by a hex nut 68.

For steam control: the fibre washers and leather 69 are omitted entirely from the valve, and metal or composition used instead.

As a throttling valve, the handle is raised to a stop, sufficiently to open the pilot valve 64, allowing flow through the bleeder hole and up through plunger; full stroke of the handle fully opens the valve. The space around the stem through the plunger is much larger than the bleeder hole, thereby eliminating the possibility of wire drawing at any of the seats.

In Figs. 7 to 10 inclusive, I have shown the invention embodied in a plug type valve.

Plug cocks are used as stop or shut off valves, as three-way and as four-way distributing valves. To produce a plug cock valve a tapered plug is ground or lapped to fit into a housing or body, fluid tight, with ports in the plug to control the fluid through the openings in the housing.

My improvement refers more particularly to the method of holding and controlling the movements of the plug within the housing and the manner of entering the plug into that housing. The serious and hitherto insuperable difficulty connected with the use of plug cock valves has been the tendency of the tapered plug to stick too tightly in its housing. If the plug was sufficiently tight to prevent improper passage of fluids, it was usually too tight to be moved without considerable difficulty, overcome with manual force, which force often would break the valve itself or abrade and score the lapped metal surfaces causing the valve to leak; the leak speedily destroyed the valve due to erosion or "wiredrawing."

A certain valve is on the market with the stem attached to the larger end of the tapered plug and has a cam-shaped washer which, when the valve is closed, forces the plug tightly into its tapered socket but provides no means by which the plug may be moved from this tight seat for opening operation. Furthermore, several manufacturers force grease into the valve for the purpose of lubricating the plug-housing joint.

My improved valve employs a simple, powerful and conveniently applied force to loosen the plug for operation and the same force to reseat the plug once it has been rotated to the desired position, the latter movement of the plug being aided by the forces of gravity and hydrostatic pressure which themselves will reseat the plug should the operator neglect to do so.

My valve is constructed of such metal as is adapted to the kind of fluid to be controlled. The body or housing 70 is extended upward to form the bonnet, integral with the body, the bonnet being threaded internally, as shown, for the bearing rings, 71 and 72, and the stuffing box nut 73. The bearing rings 70 and 72, among other things, perform the same function as the shelves 21 and 22 in Figs. 1 and 2, and the shelves 50 and 51 in Figs. 3 to 5 inclusive. The tapered ported plug 74 with the stem 75 attached to the smaller end, is introduced through the bottom of the body with the stem passing up into and through the bonnet. The hole in the bottom of the valve being closed by means of a screwed plug or a flanged plate 76 in the conventional way. The bonnet or top 77 of the valve has two openings, the lower to give access to the stuffing box nut 73 and the upper to receive the handle assembly (handle 78, bearing bar 79 and bolt 80). The upper opening in this cylindrical bonnet leaves 90 degrees, cut on tangent lines shown, to form the support of the bonnet and to serve as stops 81 and 82 for bearing bar 79 when valve is operated. Bearing rings 71 and 72 are threaded into the bonnet, above and below this opening and the plug stem 75 passes through these rings. Bearing bar 79, which performs the same function as the rings 29 and 57 is shown bored to take the boss 83 of lever 78. The end 83 of lever 78 is turned to fit into bearing bar 79, then bolt 80 passes through hole in lever and through hole in stem, serving to hold them firmly together, bearing bar 79 being held against stem between stem and lever. The hole through lever 78 for bolt 80 is drilled eccentrically so that upward movement of the lever while the latter is at one side of the axis of the stem, results in a downward movement of the stem, thus loosening the plug. Downward movement of the lever while the lever is at the same side of said axis, causes an upward movement of the plug, thereby tightening the plug into its tapered seat. Due to this eccentrically drilled hole in the lever, movement of the lever also results in a movement of bearing bar 79 on bearing rings 71 and 72, backward or forward, which movement, however, is merely in accommodation to the eccentric and has no function in the valve operation. Bearing rings 71 and 72, being threaded into the bonnet, are given a fine adjustment to secure the proper position of the operating assembly (lever, bearing bar and bolt) which position is such that the plug is tightly seated in the position shown and is loosened by raising lever 78 to an approximately horizontal position. Four spanner wrench holes are drilled in bearing rings 71 and 72, for the purpose of making this adjustment, the packing ring 73 being adjusted in the same manner with holes drilled to engage the wrench. Set screws hold the bearing rings in proper adjustment.

It is to be noted that, in the position shown in the drawings, the valve is open and bearing bar 79 is lying tangent to the stem and against the face 81 of the bonnet support, the lever is down and holding the plug 74 tightly into its tapered seat. It would be very awkward to try to rotate the stem by pulling the lever around from the position shown, therefore it is more convenient, besides being absolutely necessary, to raise the lever to about a horizontal position before attempting to rotate the plug. Raising the lever to that position loosens the plug which then may be easily rotated; bearing bar 79 sliding around between bearing rings 71 and 72 until it strikes the other stop 82 at the opposite side from which it previously rested; the operator then drops the lever which forces the plug back to its seat with a very powerful action from cam-multiplied gravity together with hydrostatic pressure.

As the structure in Figs. 7 to 10 inclusive, operates on the same principle as the structures shown in Figs. 1 to 6 inclusive, it will be understood that if the lever 76 is swung from the position shown in Fig. 7 entirely over to the other side of the axis of the stem, the weight on the lever will function to move the valve plug away from its seat and to hold it unseated.

A small hole 85 drilled lengthwise of the tapered plug eliminates any intervalve pressure which might gather either in the chamber or below the plug.

If the plug should become too tightly seated, due to long disuse of the valve or other unusual cause, a tap on the slightly protruding head 86 of the stem, after the lever is raised, quickly loosens the plug without possible harm to any part of the valve.

In place of the weight on the handle, in any one of the embodiments of the invention, a spring may be used, as shown in Figs. 11 and 12. In such case, a spring 150 will be coiled about the cylinder 151 of the handle 152. One end of the spring, as shown at 153, is hooked over the handle, and its other end is anchored to the slide block 155, as shown at 154.

From the foregoing, it is believed that the constructions, operation and advantages of the invention may be readily understood by those skilled in the art, and I am aware that changes may be made in the details disclosed, without departing from the spirit of the invention, as expressed in the claims.

What I claim and desire to secure by Letters Patent is:

1. In a valve, a valve casing having an inlet and an outlet with a valve seat interposed between the same, a valve head cooperating with said seat, a valve stem connected to said head, shelves fixed in position relatively to said casing, a ring slidably engaging the shelves and normally held in fixed position, a cam rotating in the ring, a bolt pivotally and eccentrically connecting the cam to said stem, and a handle for operating said cam.

2. In a valve, a valve casing having an inlet and an outlet with a valve seat interposed between the same, a valve head cooperating with said seat, a valve stem connected to said head, shelves fixed in position relatively to said casing, a ring slidably engaging the shelves and normally held in fixed position, a cam rotating in the ring, a bolt pivotally and eccentrically connecting the cam to said stem, and a handle for operating said cam, said handle being weighted for holding the valve head in open or closed position.

3. In a valve, a valve casing having an inlet and an outlet with a valve seat interposed between the same, a valve head cooperating with said seat, a valve stem connected to said head, shelves fixed in position relatively to said casing, a ring slidably engaging the shelves and normally held in fixed position, a cam rotating in the ring, a bolt pivotally and eccentrically connecting the cam to said stem, and a handle for operating said cam, the shelves and ring having cooperating plane surfaces.

4. In a valve, a valve casing having an inlet and an outlet with a valve seat interposed between the same, a valve head cooperating with said seat, a valve stem connected to said head, shelves fixed in position relatively to said casing, a ring slidably engaging the shelves and normally held in fixed position, a cam rotating in the ring, a bolt pivotally and eccentrically connecting the cam to said stem, and a handle for operating said cam, the ring having pairs of oppositely disposed plane peripheral surfaces which engage said shelves.

5. In a valve, a casing having an inlet and an outlet, a valve seat in the casing interposed between the inlet and outlet, a valve cooperating with said seat and movable axially and rotatably, shelves fixed in position relatively to said casing, a ring slidably engaging the shelves and normally held in fixed position, a cam rotating in the ring, a member connected to the valve, a bolt pivotally and eccentrically connecting the cam to said member, and a handle for operating said cam and for rotating the valve.

6. In a valve, a casing having an inlet and an outlet, a valve seat in the casing interposed between the inlet and outlet, a valve cooperating with said seat and movable axially and rotatably, shelves fixed in position relatively to said casing, a ring slidably engaging the shelves and normally held in fixed position, a cam rotating in the ring, a member connected to the valve, a bolt pivotally and eccentrically connecting the cam to said member, a handle for operating said cam and for rotating the valve, and force exerting means cooperating with the handle for moving the valve toward or away from its seat after movement has been initiated by the operator.

GEORGE S. BOWES.